United States Patent [19]

Berger et al.

[11] 3,919,200
[45] Nov. 11, 1975

[54] NOVEL NITROFURAN COMPOUNDS AND THERAPEUTIC COMPOSITIONS

[76] Inventors: Herbert Berger, Mannheim-Kafertal; Rudi Gall, Grossachsen; Max Thiel; Wolfgang Vömel, both of Mannheim; Winfriede Sauer, Mannheim-Wallstadt, all of Germany

[22] Filed: Sept. 5, 1972

[21] Appl. No.: 286,516

[30] Foreign Application Priority Data
Sept. 21, 1971 Germany............ 2147013

[52] U.S. Cl............. 260/240 A; 424/250; 424/251; 424/263; 424/270; 424/273; 260/250 A; 260/256.4 N; 260/256.4 R; 260/296 R; 260/306.8 D; 260/306.8 R; 260/294.8 D; 260/294.8 R
[51] Int. Cl............. C09b 23/00; C07 51/04
[58] Field of Search.. 260/240 A, 256.4 N, 256.4 R, 260/296 R, 306.8 D, 306.8 R, 250 A, 294.8 R, 294.8 D

[56] References Cited
UNITED STATES PATENTS

| | | | |
|---|---|---|---|
| 3,542,865 | 11/1970 | Bayer | 260/556 AR |
| 3,704,301 | 11/1972 | Berger et al. | 260/251 R |
| 3,823,137 | 7/1974 | Berger et al. | 260/240.1 |

FOREIGN PATENTS OR APPLICATIONS
260,277  2/1968  Austria .................. 260/240 A

*Primary Examiner*—John D. Randolph

[57] ABSTRACT

Novel nitrofuran compounds of the formula

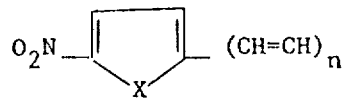

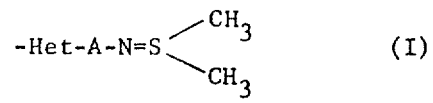

wherein
X is oxygen or sulfur;
A is a valency bond or an aminomethylene bridge;
$n$ is 0 or 1; and
Het is an aromatic five- or six-membered ring containing from one to three hetero-atoms in the ring at least one of which is nitrogen, or
Het is a bicyclic system of s-triazole and a five- or six-membered aromatic ring; and the pharmacologically compatible salts thereof;
are outstandingly active in the treatment of urinary tract infections.

21 Claims, No Drawings

NOVEL NITROFURAN COMPOUNDS AND THERAPEUTIC COMPOSITIONS

The present invention is concerned with novel nitrofuran compounds, with therapeutic compositions containing them, and with therapeutic methods using such compounds.

The new nitrofuran (or nitrothienyl) compounds of the present invention are of the formula:

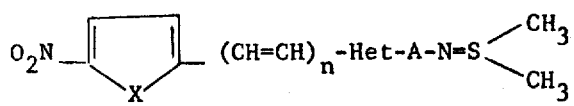

(I)

wherein
X is oxygen or sulfur;
A is a valency bond or an aminomethylene bridge;
n is 0 or 1; and
Het is an aromatic five- or six-membered ring containing from one to three hetero-atoms in the ring at least one of which is nitrogen,
or Het is a bicyclic system of s-triazole and a five- or six-membered aromatic ring; in all cases (i.e., for all "Het", n, and A definitions) the left hand part of the formula (i.e., to the left of "Het" in the formula) is linked to a carbon atom in the α- or β-position to a cyclic nitrogen atom in Het and A is linked to any other substitutable carbon atom in Het;
and the pharmacologically compatible salts thereof.

Thus, Het is a mono- or bi-cyclic hetero-atom containing system wherein each ring contains from one to three nitrogen atoms (one of which may be common to both rings in the bicyclic system) and from 5 to 6 ring atoms and wherein the other ring atoms are carbon atoms or hetero atoms such as N or S or O, with the proviso that there are no more than three hetero atoms in each ring (inclusive of the required nitrogen atom); preferably, in the case of the bicyclic system, the linkage of Het to the left hand side of the molecule is via one ring and the linkage to A is via the other ring. Also, preferred, in the bicyclic compounds, are those wherein at least one ring preferably contains three nitrogen atoms.

In the monocyclic case, the ring preferably contains two nitrogen atoms; and such two nitrogen-containing ring may also contain one hetero atom other than nitrogen, preferably sulfur, as part of the ring system.

Nitrofuran derivatives connected directly or via a vinyl bridge with a hetero-aromatic system are already known in large numbers and are characterized by a more or less great anti-microbial action; the compounds according to the present invention show, in vitro, an anti-microbial action which corresponds to that of the best known commercial products and, in addition, they are extraordinarily active in vivo. In particular, the compounds according to the present invention are excreted in high concentration in the urine and are, therefore, particularly suitable for the treatment of infections of the urinary tract.

Of special pharmacological interest are those compounds in which Het represents a thiazole, thiadiazole, pyridine, pyrimidine or pyridiazine ring or a bicyclic system in which one of these aromatic rings is condensed with s-triazole, especially an s-triazolo[4,3-b]pyridazine system.

The new compounds according to the present invention can be prepared, for example, by condensing a compound of the general formula:

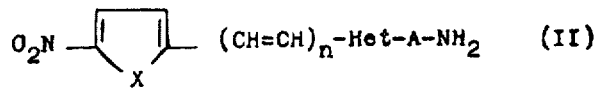

wherein A, X, n and Het have the same meanings as above, with dimethyl sulphoxide; or by nitrating a compound of the general formula:

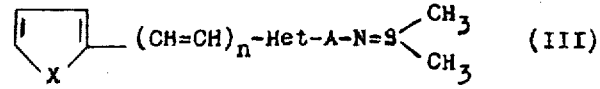

wherein X, n, Het and A have the same meanings as above; or, in the case in which n is 1, condensing a compound of the general formula:

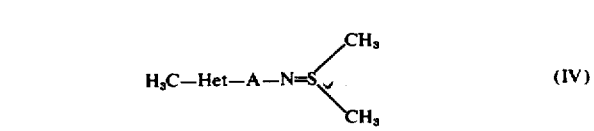

wherein A and Het have the same meanings as above, with 5-nitro-furfural or 5-nitrothiophene-2-aldehyde or with a reactive derivative thereof; whereafter, if desired, the compound obtained is converted into a pharmacologically compatible salt.

The condensation of compounds (II) with dimethyl sulphoxide even takes place at temperatures below 60°C. in the presence of an agent splitting off water, such as phosphorus pentoxide, phosphorus oxychloride or mesyl chloride, and in the presence of a tertiary base, such as pyridine or triethylamine.

The nitration of compounds (III) must be carried out under conditions which are as mild as possible in order not to attack the sulphimide bond. Amyl nitrate or nitrogen dioxide in inert solvents or anhydrous nitric acid is concentrated sulphuric acid or acetic anhydride in the cold, can be used as nitration agents.

The condensation of compounds (IV) with 5-nitrofurfural or 5-nitrothiophene-2-aldehyde can be carried out, for example, in acetic anhydride. As reactive derivatives of the aldehydes, there can be used, for example, the diacyl derivatives, preferably the diacetates.

The pharmacologically compatible salts can be prepared, for example, by neutralization of the compounds (I) with non-toxic, inorganic or organic acids. For this purpose, there can be used, for example, hydrochloric acid, sulphuric acid, phosphoric acid, hydrobromic acid, acetic acid, lactic acid, citric acid, oxalic acid, malic acid, salicylic acid, malonic acid, maleic acid, succinic acid or alkyl-sulphonic acids.

The following examples are given for the purpose of illustrating the compounds of the present invention and their preparation:

EXAMPLE 1

Preparation of 2-(5-Nitro-2-furyl)-4-dimethylsulfiminopyrimidine

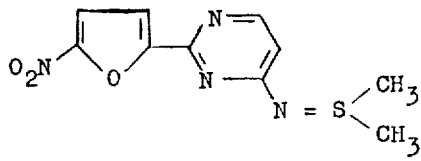

2.1 g. 2-(5-nitro-2-furyl)-4-aminopyrimidine were suspended in a mixture of 20 ml. dimethyl sulfoxide, 10 ml. pyridine and 2.75 ml. triethylamine. While stirring at ambient temperature, a solution of 1.85 ml. phosphorus oxychloride in 10 ml. dioxan was slowly added dropwise, the internal temperature of the reaction mixture thereby increasing to 60°C. The suspension temporarily became of low viscosity. After stirring for an hour at a bath temperature of 60°C., the reaction mixture was cooled and the precipitated yellow crystals were filtered off with suction and washed with dioxan. They were then dissolved in water, filtered with charcoal and the filtrate acidified with 6N hydrochloric acid. The product which separates out was filtered off with suction, washed with an aqueous solution of sodium bicarbonate and then with water until neutral and thereafter dried. There was thus obtained 1.2 g. paper chromatographically uniform 2-(5-nitro-2-furyl)-4-dimethylsulfiminopyrimidine which melts, with decomposition, at 193° – 196°C. The spectra and elementary analyses confirm the structure.

EXAMPLE 2

Preparation of 3-(5-Nitro-2-furyl)-6-dimethylsulfimino-s-triazolo[4,3-b]-pyridazine

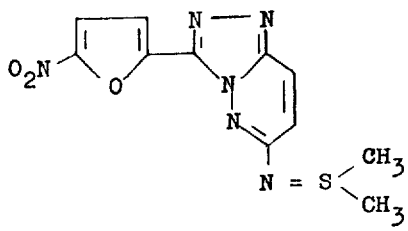

1 g. crude 3-(5-nitro-2-furyl)-6-amino-s-triazolo[4,3-b]pyridazine were dissolved in a mixture of 14 ml. dimethyl sulfoxide, 4 ml. anhydrous pyridine and 1.1 ml triethylamine and, after stirring for 20 minutes at 50° to 60°C., mixed, within the course of 20 minutes, with a solution of 0.7 ml. methane-sulfochloride in 4 ml. dioxan and further stirred for 1 hour at this temperature, whereafter the crystals obtained were filtered off with suction (0.66 g.), washed with water and ethanol and finally with ether and recrystallized from 23 ml. dimethyl formamide, with the addition of charcoal, to give 0.45 g. orange-colored 3-(5-nitro-2-furyl)-6-dimethylsulfimino-s-triazolo[4,3-b]pyridazine which melts, with foaming, at 253°C.

EXAMPLE 3

Preparation of 1-(5-Nitro-2-furyl)-2-(6-dimethylsulfimino-3-pyridazinyl)-ethylene

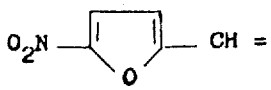

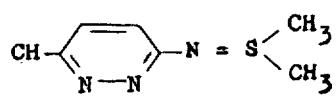

A solution of 3.7 ml. phosphorus oxychloride in 20 ml. anhydrous dioxan was added dropwise at 50° – 60°C., within the course of 30 minutes and with stirring, to 4.6 g. 1-(5-nitro-2-furyl)-2-(6-amino-3-pyridazinyl)-ethylene in a mixture of 20 ml. dimethyl sulfoxide, 70 ml. anhydrous pyridine and 5.5 ml. triethylamine. The reaction mixture was stirred for an hour at this temperature and the product obtained was filtered off with suction, washed with pyridine and treated with water. The orange-colored crystals obtained were filtered off with suction and dried in a vacuum at 80°C. After recrystallization of the product (3.05 g.) from a mixture of 30 ml. dioxan and 6 ml. dimethyl formamide, there were obtained 2.38 g. dark red crystals of 1-(5-nitro-2-furyl)-2-(6-dimethylsulfimino-3-pyridazinyl)-ethylene, which has a melting point of 196° to 198°c.

EXAMPLE 4

Preparation of 3-(5-nitro-2-furyl)-6-(dimethylsulfiminomethyleneamino)-s-triazolo[4,3-b]pyridazine

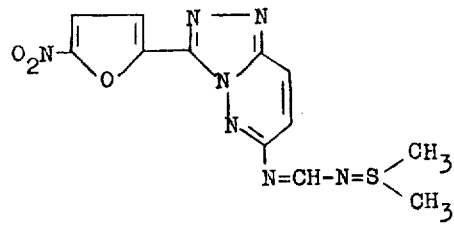

A solution of 1.36 ml. methane-sulfochloride in 8 ml. anhydrous dioxan were added dropwise, with stirring, within the course of 20 minutes, to 2.16 g. crude 3-(5-nitro-2-furyl)-6-(aminomethyleneamino)-s-triazolo[4,3-b]-pyridazine in 40 ml. of a mixture of 40 ml. dimethyl sulfoxide, 8 ml. anhydrous pyridine and 2.2 ml. triethylamine, whereby, for a short time, solution occurs and the temperature increases to about 38°C. After stirring the reaction mixture for 1 hour at ambient temperature, the crystals obtained were filtered off with suction, washed with pyridine and triturated with water to give 1.45 g. of a substance which, after recrystallization from 35 ml. of a mixture of 80 percent dioxan and 20 percent dimethyl formamide, gives 0.8 g. of yellow crystals of 3-(5-nitro-2-furyl)-6-(dimethylsulfiminomethyleneamino)-s-triazolo[4,3-b]-pyridazine which melts, with foaming, at 198° to 200°C.

EXAMPLE 5

Preparation of 5-(5-Nitro-2-furyl)-2-dimethylsulfimino-1,3,4-thiadiazole.

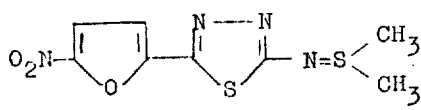

A solution of 3.7 ml. phosphorus oxychloride in 20 ml. anhydrous dioxan was added dropwise, with stirring, at 50° to 60°C and within the course of 20 minutes to 4.24 g. 5-(5-nitro-2-furyl)-2-amino-1,3,4-thiadiazole in a mixture of 50 ml. dimethyl sulfoxide, 20 ml. pyridine and 5.5 ml. triethylamine, whereafter the reaction mixture was further stirred at this temperature for 1 hour. It was then diluted with ether at ambient temperature and the oil which separates out was triturated with water, 2.47 g. of solid product thereby being obtained. After recrystallization from 67 ml. dioxan, with the addition of active charcoal, there was obtained 1.5 g. 5-(5-nitro-2-furyl)-2-dimethylsulfimino-1,3,4-thiadiazole, which melts at 204° to 206°C.

EXAMPLE 6

Preparation of 3-(5-Nitro-2-furyl)-5-dimethylsulfimino-1,2,4-thiadiazole

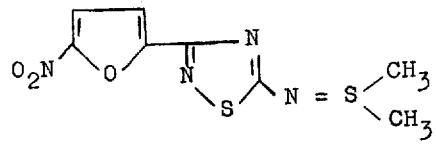

From 4.24 g. 3-(5-nitro-2-furyl)-5-amino-1,2,4-thiadiazole, there were obtained, under the same reaction conditions as in Example 5, 3.22 g. of a solid crude product which, after recrystallization from 75 ml. dioxan, with the addition of active charcoal, gives 1.5 g. 3-(5-nitro-2-furyl)-5-dimethylsulfimino-1,2,4-thiadiazole, which has a melting point of 206° to 207°C.

EXAMPLE 7

Preparation of 3-[2-(5-nitro-2-furyl)-vinyl]-6-dimethylsulfimino-s-triazolo[4,3-b]pyridazine

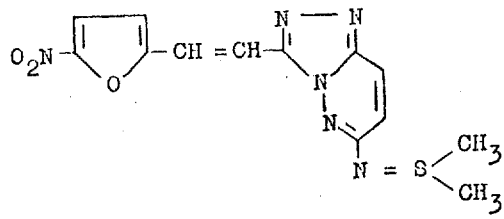

In a manner analogous to that described in Example 1, with the use of 2.7 g. 3-[2-(5-nitro-2-furyl)-vinyl]-6-amino-s-triazolo[4,3-b]pyridazine, there was obtained 1.1 g. 3-[2-(5-nitro-2-furyl)-vinyl]-6-dimethylsulfimino-s-triazolo[4,3-b]pyridazine in the form of red crystals which melt, with decomposition, at 227° to 228°C.

EXAMPLE 8

Preparation of 3-(5-Nitro-2-thienyl)-6-dimethylsulfimino-s-triazolo[4,3-b]pyridazine

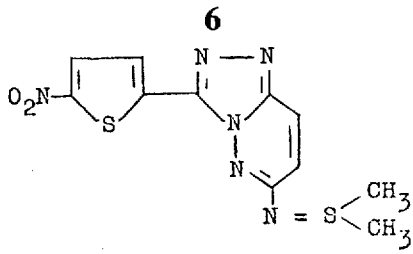

2.6 g. 3-(5-nitro-2-thienyl)-6-amino-s-triazolo[4,3-b]-pyridazine were suspended in a mixture of 20 ml. dimethyl sulfoxide, 10 ml. pyridine and 2.75 ml. triethylamine. While stirring, there was slowly added dropwise, at ambient temperature, a solution of 1.85 ml. phosphorus oxychloride in 10 ml. dioxan, the internal temperature of the reaction mixture thereby increasing to 68°C. The suspension obtained of low viscosity was further stirred for an hour at 60°C., then cooled, filtered off with suction and the residue washed with dioxan, water and with methanol. There was obtained 0.7 g. of a crude product which melts, with decomposition, at 228°C. After recrystallization from boiling dioxan, with the addition of dimethyl formamide, there was obtained 3-(5-nitro-2-thienyl)-6-dimethylsulfimino-s-triazolo[4,3-b]pyridazine in the form of orange-yellow crystals which melt, with decomposition, at 234° to 236°C., these crystals being paper chromatographically uniform. Spectra and elementary analyses confirm the structure.

The starting material used was prepared in the following manner: 5-nitrothiophene-2-aldehyde was reacted in alcohol with 3-hydrazino-6-chloropyridazine to give the corresponding hydrazone which melts, with decomposition, at 283°C. This was oxidatively cyclised in glacial acetic acid with lead tetraacetate. The so obtained 3-(5-nitro-thienyl)-6-chloro-s-triazolo[4,3-b]pyridazine, which melts at 215° - 217° C., was aminated in the usual manner by reaction with potassium phthalimide and subsequent acid splitting. The crude product obtained melts, with decomposition, at 240°C.

EXAMPLE 9

Preparation of 2-(5-Nitro-2-furyl)-4-dimethylsulfiminopyrimidine 0.2 g. 2-(5-nitro-2-furyl)-4-aminopyrimidine was dissolved in a mixture of 2 ml. dioxan and 6 ml. dimethyl sulfoxide. A mixture of 0.4 g. phosphorus pentoxide with sea sand was introduced into this solution at ambient temperature. Finally, a solution of 0.1 ml. triethylamine in 2 ml. dioxan was added thereto dropwise, with stirring. After further stirring for 2 hours, a paper chromatogram of a sample shows no starting material but a new spot was observed which was identical with the product prepared according to Example 1. The reaction mixture was further worked up in the manner described in Example 1.

EXAMPLE 10

Preparation of 3-[2-(5-nitro-2-furyl)-vinyl]-6-(dimethylsulfiminomethyleneamino)-s-triazolo[4,3-b]pyridazine

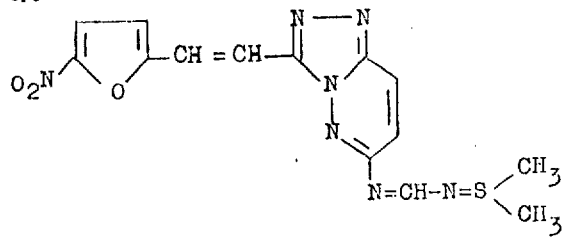

3 g. 3-[2-(5-nitro-2-furyl)-vinyl]-6-(aminomethyleneamino)-s-triazolo[4,3-b]pyridazine were reacted with dimethyl sulfoxide in a manner analogous to that described in Example 1. There was obtained 1.7 g. of the desired product. After recrystallization from dimethyl formamide, there was obtained 1.3 g. yellow-orange crystals of 3-[2-(5-nitro-2-furyl)-vinyl]-6-(dimethylsulfiminomethylene amino)-s-triazolo[4,3-b]pyridazine which melts, with decomposition, at 208° to 209°C.

The starting material used is prepared in the following manner: 3-[2-(5-nitro-2-furyl)-vinyl]-6-amino-s-triazolo[4,3-b]pyridazine is heated with orthoformic acid triethyl ester in the presence of acetic anhydride to give the corresponding imido ether, which melts at 141° – 143°C. and which, in dioxan, by passing in dry gaseous ammonia, gives the desired formamidine which melts, with decomposition at 231° to 233°C.

The bacteriostatic activity of the compounds in accordance with the invention was evaluated in vitro and in vivo. The following comparison compound and compounds according to the invention were used in the tests:

| Compound No. | Chemical Name |
| --- | --- |
| A (Comparison Compound) | N-(5-Nitrofuryliden)-1-amino-hydantoine (sold under the trade name "Furadantin" by Norwich Pharmacal Co.) |
| 1 | 3-(5-Nitro-2-furyl)-6-dimethylsulfimino-s-triazolo-[4,3-b]pyridazine |
| 2 | 3-(5-Nitro-2-furyl)-6-(dimethylsulfimino-methylene-amino)-s-triazolo[4,3-b]pyridazine |
| 3 | 1-(5-Nitro-2-furyl)-2-(6-dimethylsulfimino-3-pyridazinyl)-ethylene |
| 4 | 5-(5-Nitro-2-furyl)-2-dimethylsulfimino-1,3,4-thiadiazol |
| 5 | 3-(5-Nitro-2-furyl)-5-dimethylsulfimino-1,2,4-thiadiazol |
| 6 | 2-(5-Nitro-2-furyl)-4-dimethylsulfimino-pyrimidine |
| 7 | 3-[2-(5-Nitro-2-furyl)-vinyl]-6-dimethylsulfimino-s-triazolo[4,3-b]pyridazine |
| 8 | 3-(5-Nitro-2-thienyl)-6-dimethylsulfimino-s-triazolo[4,3-b]pyridazine |
| 9 | 3-[2-(5-Nitro-2-furyl)-vinyl]-6-(dimethylsulfimino-methylene-amino)-s-triazolo[4,3-b]pyridazine |

The absolute bacteriostatic minimal concentration in vitro of the test compounds, for six different bacterial species, is set out in micrograms of test compound per milliliter in the following Table I.

In addition the compounds were evaluated with respect to their bacteriostatic activity in the excreted urine of rats following oral administration. The results of these experiments are set out in Table II. The bacteriostatic maximum dilution of urine against *Escherichia coli* (106) was determined 22 hours after 20 milligrams of test compound per kilogram of body weight had been orally administered to the rats. Six (nine) rats were employed for each experiment (test compound); the test results are calculated on the basis of 50(75) milliliter urine samples. Each value reported represents the result of one experiment and is expressed in terms of the volumes of water with which one volume of the excreted urine sample could be diluted and still retain its bacteriostatic property, due to the presence of test compound.

TABLE I

ABSOLUTE BACTERIOSTATIC ACTIVITY IN VITRO (MINIMAL CONCENTRATION IN μg/ml)

| Compound No. | Streptococcus faecalis (155) | Escherichia coli (18) | Escherichia coli (106) | Proteus mirabilis(298) | Proteus mirabilis(279) | Pseudomonas aeruginosa(71) |
| --- | --- | --- | --- | --- | --- | --- |
| A | 16 | 8 | 4 | 128 | 128 | >128 |
| 1 | 0.25 | 0.062 | 0.031 | 4 | 1 | 1 |
| 2 | 2 | 0.125 | 0.062 | 4 | 2 | 2 |
| 3 | 0.125 | 0.062 | 0.031 | 4 | 8 | 8 |
| 4 | 4 | 1 | 0.5 | 64 | 64 | — |
| 5 | 4 | 0.25 | 0.125 | — | 16 | 4 |
| 6 | 1 | 0.25 | 0.125 | 16 | 16 | 16 |
| 7 | 0.031 | 0.016 | 0.008 | 2 | 1 | 0.5 |
| 8 | 4 | — | 2 | — | — | — |
| 9 | 0.062 | 0.062 | 0.016 | 0.5 | 4 | 1 |

TABLE II

| Compound No. | Maximum Bacteriostatic Dilution (Volume Ratio) |
| --- | --- |
| A | 1:54 |
|   | 1:30 |
|   | 1:41 |
|   | 1:19 |
|   | 1:40 |
|   | 1:21 |
| 1 | 1:88 |
|   | 1:600 |
|   | 1:520 |
| 2 | 1:1400 |
|   | 1:2107 |
| 4 | 1:18 |
|   | 1:15 |
| 5 | 1:37 |
|   | 1:58 |
|   | 1:36 |
| 7 | 1:288 |
|   | 1:300 |
|   | 1:136 |
| 9 | 1:150 |
|   | 1:166 |

The compounds of this invention are anti-microbials and have been found to be bactericidal to the pathogens found in surface infections, gram negative as well as gram positive. They additionally have utility as agents for routine treatment of acute and chronic bacterial infections of the urinary tract, including those caused by Proteus ap. Further they lend themselves because of their properties to use in the prevention or treatment of mixed surface infections or wounds, severe burns, cutaneous ulcers, pyodermas osteomyelitis, preparation of wounds and burns for skin grafting and prevention of infection of grafts and donor sites.

The compounds of the invention can be employed in the form of aqueous solutions or suspensions thereof, as for instance, in the form of an 0.01 to 0.05% aqueous suspension or solution; in the form of solutions in non-aqueous, hygroscopic liquid vehicles such as polyethylene glycol, for instance 0.1 – 0.5% solutions in polyethylene glycol; incorporation into a water-soluble ointment-like base (concentration 0.1 – 0.5%) or in a powder base composed for instance of water-soluble polyethylene glycols (concentration 0.1 to 0.5%); or in a form suitable for ingestion. Thus, a preferred form is a tablet containing 50 to 200 mg. of active compound. Depending on the conditions, symptomatic and laboratory responses 100 to 400 mg. per day can be administered. Another preferred form for orally administering the compounds of the invention is in the form of a suspension thereof in a water miscible flavored gel. Such gel can contain from 1 to 10 mg. of compound per cc.

The compounds (I) can be administered orally and parenterally in admixture with a liquid or solid pharmaceutical diluent or carrier. As injection medium, it is preferable to use water which contains the stabilizing agents, solubilizing agents and/or buffers conventional for injection solutions. Additives of this type include for example, tartrate and borate buffers, ethanol, dimethyl sulphoxide, complex-forming agents (for example ethylene-diamine-tetraacetic acid) and high molecular weight polymers (for example liquid polyethylene oxide) for viscosity regulation. Solid carrier materials include, for example starch, lactose, mannitol, methylcellulose, talc, highly dispersed silicic acid, high molecular weight fatty acids (for example stearic acid), gelatine, agar-agar, calcium phosphate, magnesium stearate, animal and vegetable fats and solid high molecular weight polymers (for example polyethylene glycols). Compositions suitable for oral administration can, if desired, also contain flavoring and/or sweetening agents. For external use, the compounds (I) according to the present invention can also be used in the form of powders and salves; for this purpose, they are mixed, for example, with powdered, physiologically compatible diluents or with conventional salve bases.

It will be understood that the specification and examples are illustrative but not limitative of the present invention and that other embodiments within the spirit and scope of the invention will suggest themselves to those skilled in the art.

What is claimed is:

1. Nitrofuran compound of the formula

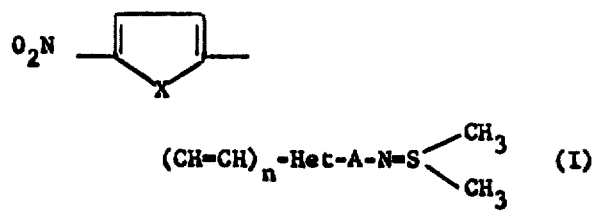

wherein
X is oxygen or sulfur;
A is a valency bond or an amino-methylene bridge;
$n$ is 0 or 1; and
Het is thiazole, thiadiazole, pyridine, pyrimidine or pyridazine ring or s-triazolo-[4,3]-pyridazine.

2. Compound as claimed in claim 1 wherein Het is linked to the left hand portion of the molecule via a carbon atom in the $\alpha$- or $\gamma$-position to a cyclic nitrogen atom in Het.

3. Compound as claimed in claim 2 wherein A is linked to a substitutable carbon atom in Het other than the carbon atom linked to said left hand portion of the molecule.

4. Compound as claimed in claim 1 wherein Het is a bi-cyclic system consisting of pyridazine condensed with s-triazole.

5. Compound as claimed in claim 1 wherein Het is a thiazole ring.

6. Compound as claimed in claim 1 wherein Het is a thiadiazole ring.

7. Compound as claimed in claim 1 wherein Het is a pyridine ring.

8. Compound as claimed in claim 1 wherein Het is a pyrimidine ring.

9. Compound as claimed in claim 1 wherein Het is a pyridazine ring.

10. Compound as claimed in claim 1 wherein Het is the condensation product of s-triazole with pyridazine.

11. Compound as claimed in claim 10 wherein said condensation product is an s-triazolo[4,3-b]pyridazine system.

12. Compound as claimed in claim 1 wherein X is oxygen.

13. Compound as claimed in claim 1 wherein X is sulfur.

14. Compound as claimed in claim 1 wherein A is a valency bond.

15. Compound as claimed in claim 1 wherein A is an aminomethylene bridge.

16. Compound as claimed in claim 1 wherein $n$ is zero.

17. Compound as claimed in claim 1 wherein $n$ is one.

18. Compound as claimed in claim 1 designated 3-(5-nitro-2-furyl)-6-dimethylsulfimino-s-triazolo[4,3-b]-pyridazine.

19. Compound as claimed in claim 1 designated 3-(5-nitro-2-furyl)-6-dimethylsulfiminomethyleneamino)-s-triazolo[4,3-b]pyridazine.

20. Compound as claimed in claim 1 designated 3-[2-(5-nitro-2-furyl)-vinyl]-6-dimethylsulfimino-s-triazolo[4,3-b]pyridazine.

21. Compound as claimed in claim 1 designated 3-[2-(5-nitro-2-furyl)-vinyl]-6-(dimethylsulfiminomethyleneamino)-s-triazolo[4,3-b]pyridazine.

* * * * *